United States Patent [19]

Tugayé

[11] Patent Number: 4,476,494
[45] Date of Patent: Oct. 9, 1984

[54] APPARATUS FOR CENTERING AND STABILIZING THE SIZE OF A TARGET IMAGE

[76] Inventor: Jean Tugayé, 28 Av Président Kennedy, 75016 Paris (16), France

[21] Appl. No.: 361,553

[22] Filed: Mar. 24, 1982

[30] Foreign Application Priority Data

Mar. 30, 1981 [FR] France ............... 81 06330

[51] Int. Cl.³ .................. H04N 5/34; H04N 7/18
[52] U.S. Cl. ................... 358/222; 244/3.17; 358/126
[58] Field of Search .......... 358/222, 125, 126, 113, 358/109; 364/516, 517, 565; 343/6 TV; 244/3.16, 3.17

[56] References Cited

U.S. PATENT DOCUMENTS 3,586,770 6/1971 Bonebreak et al. ............ 244/3.17
4,316,218 2/1982 Gay .............................. 358/125

Primary Examiner—John C. Martin
Assistant Examiner—Jeffrey D. Sutherland
Attorney, Agent, or Firm—Larson and Taylor

[57] ABSTRACT

A stabilized image of a scene is provided by scanning the scene with a camera to provide pixels representative of the scene, providing individual representations of the pixels during each scan of the camera as digital words identifying an elevation address, an azimuth address, and the brightness of the pixel, generating a reference frame having a matrix of predetermined points each having an azimuth address and an elevation address, maintaining the frame in an invariable position with respect to the scene irrespective of angular movements of the camera, and for assigning the pixels to those of the points with which there is the best address match.

9 Claims, 9 Drawing Figures

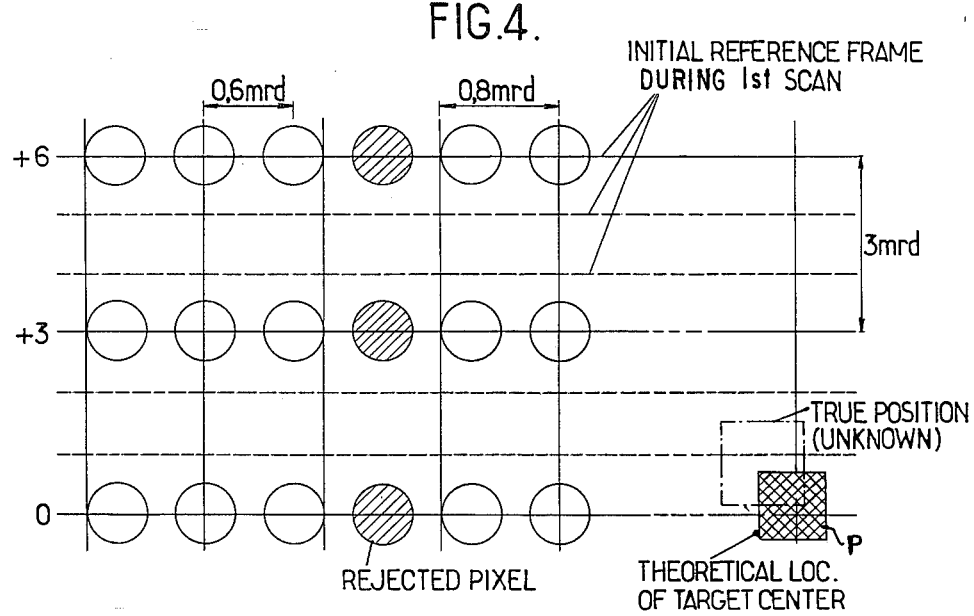
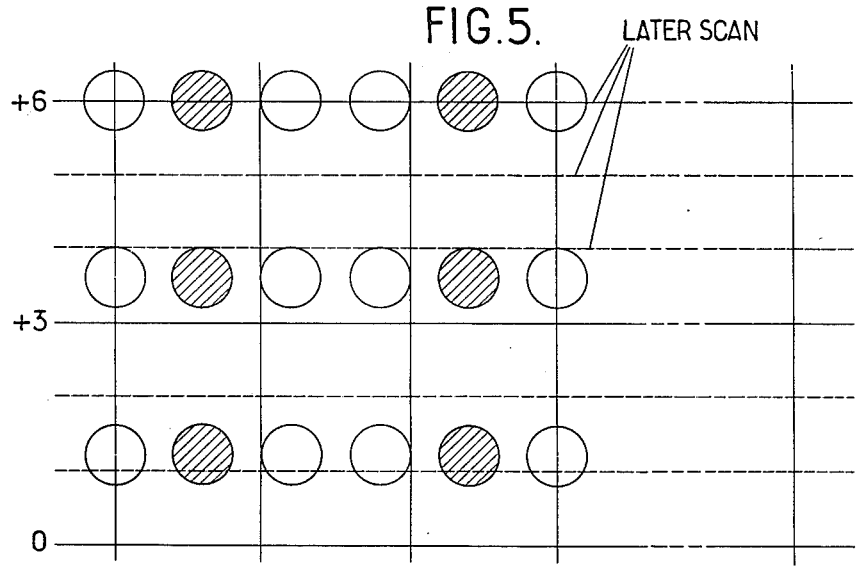

APPARATUS FOR CENTERING AND STABILIZING THE SIZE OF A TARGET IMAGE

This invention is concerned generally with the field of representation of the image of a scene and, more specifically, with a method and an apparatus for stabilizing an image of a scene as represented from signals delivered by an optoelectrical camera, particularly a T.V. or I.R. camera which, in operation, may be subject to movements with respect to the scene. Such movements cause a change in the location of the scene to be observed in the field of view of the camera.

The field of stabilization has wide applications, since angular movements and linear movements occur in a number of situations. For instance, angular movements occur when the camera is not fixed or mechanically stabilized by appropriate means with respect to the scene. Linear movement resulting in a variation in the distance between the camera and the scene occurs when the camera is carried by a vehicle or body moving toward or away from the scene. In the latter case, the scene is seen by the camera under an angle which is variable. If there is no stabilization of the size of the image representation, difficulties are encountered for carrying out pattern recognition by comparison of the image of the scene with a stored pattern, as defined for instance by significant features thereof, such as graphemes or histogram.

It is an object of the invention to provide a process and apparatus for stabilizing an image provided by a camera which operates by data processing only; it is an other object to provide a process and apparatus suitable for use in any system comprising a camera whose field of view consists of individual pixels each defined by its coordinates and a brightness signal (and possibly also by chrominance signals). It is a more specific object of the invention to compensate for angular movements of the camera, typically about two orthogonal axis, one of which is parallel to the scan direction; it is another specific object of the invention to provide a zoom effect without requiring an intricate system of optical lense. It is still a more specific object of the invention to provide a centering and stabilizing system particularly suitable for use in a missile guidance system arranged to home onto a target during at least part of its flight.

For that purpose, a method according to the invention for real time stabilization of the image representation consisting of pixels representative of a scene and provided by an optoelectrical camera includes predetermining an image centering reference frame whose position is unvariable with respect to the scene. The frame may be defined by a network or set of addresses representative of a pluarlity of points evenly distributed with respect to the scene; the actual or current coordinates of each pixel in the field of view are determined; and the pixels are assigned to the points of the reference frame which have the best match with said coordinates. The latter operation may easily be carried out by transcoding.

Oftentimes, the number of pixels delivered by the camera, at least for one of the directions of the image (line scan direction for instance) is high enough for transcoding to be made by selecting those pixels whose deviation or offset with respect to the addresses of said points in the reference frame is lower than a predetermined value. Assuming that there is some amount of redundancy between adjacent pixels, there is no attendant loss of definition.

In other cases, the situation is reversed: along one direction at least of the image, the spacing between points of the reference frame will be close enough for transcoding to be carried out by assigning each of the available pixels to the point of the reference frame which has the closest address.

That method makes it possible to stabilize the image of the scene by moving the reference frame within the field of view responsive to the angular movements of the camera between two successive complete scans. The method however requires that the angular movements of the camera are sufficiently low for the scene to remain within the field of view of the camera.

Size stabilization of the image may be made simply by scaling up or down the reference frame in relation with the distance between the camera and the scene. Then, it is possible to get an image representation which has an invariant size, whereby pattern recognition may be more easily carried out. The approach has however other advantages. Scaling up and down the reference frame achieves a zoom effect which is of advantage since it only involves data processing and does not require an optical lens system. Another advantage is that there is no change in the brightness of the pixels, while that result would not be retained if signals representing a variable number of adjacent pixels were summed.

The invention is particularly suitable for use in the missile guidance systems using pattern recognition in an image delivered by an optoelectrical camera. That camera, typically an I.R. camera, delivers an image consisting of pixels which are evenly distributed in the horizontal and vertical directions. The apparatus may then comprise means for storing all pixels obtained during a complete scene, as represented by their coordinates (bearing and elevation) and their brightness. Means are provided for generating a reference frame which has an invariable position with respect to the scene and is defined by an address network representing the bearings and elevations of all nodes of the frame; such stabilization may be achieved by the navigation unit of the missile. Transcoding means are used for assigning the pixels to the addresses of the reference frame which have the best match with the coordinates and write their brightness in a memory for pattern recognition.

I.R. cameras are often of the type having a strip of sensing elements associated with means for optical scanning along a direction perpendicular to the strip. The sensing elements may then be connected through individual amplifiers to an encoding multiplexer. At evenly distributed intervals during a scan, the multiplexers sample the output signals of all sensors in the array and write a train of signals into a memory. All signals have a common address in the scanning direction (typically azimuth or bearing). Each signal has a distinct address representing the coordinate in the direction transverse to the scanning direction and a digital number indicating brightness. The address and the brightness associated with each particular sensing element may form a single word which is temporarily retained in a memory. The transcoder will carry out selection in two directions: in the scanning direction, the transcoder selects those addresses which are closest to the lines in the corresponding direction of the reference frame; then, for each of the addresses which have been selected in that first direction, the transcoder retains the word including an address which is closest to the coordinates of the reference frame and assigns the digital number representing brightness to the nodes of the frame.

In a camera having a sensor element strip and an optical scanning system, it is possible to increase the number of pixels in the scanning direction and to reduce their angular spacing to such an extent that the spacing of the pixels is always smaller than the spacing of the lines of the reference frame. In the direction of the strip however, considerations of cost and bulk limit the number of sensing elements and consequently the number of pixels in that direction. It may be necessary to provide a reference frame whose lines have a spacing smaller than that of the pixels. Then, the reference frame will be "informed" gradually only, by accumulation of information collected during successive scans. But the period necessary for obtaining complete information will generally be acceptable.

The invention will be better understood from reading the following description of a particular embodiment given by way of example only.

SHORT DESCRIPTION OF THE DRAWINGS

FIGS. 4 and 5 are diagrams showing a portion of the reference frame used for transcoding and centering the image, respectively during the first scan and during a subsequent scan, the position of the pixels being indicated by circles which are hatched when the pixel is rejected;

DETAILED DESCRIPTION OF A PREFERRED EMBODIMENT

The embodiment of the invention which will be described is for use in a missile guidance system which successively identifies a target by pattern recognition in an infrared image, locks on the target and tracks it. The identification procedure and the steering system of the missile will not be described here since they are not directly related with the invention.

Figure 1:
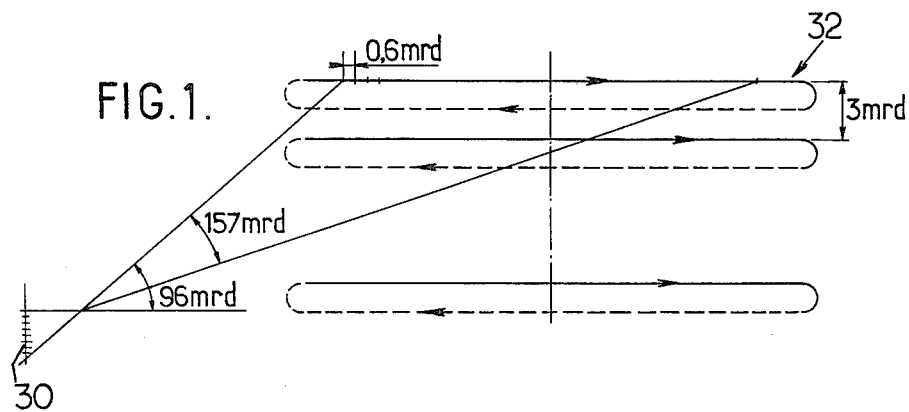
FIG. 1 is a simplified diagram showing the way of inspecting the field of view of the camera in an apparatus according to the invention.
Figure 1A:
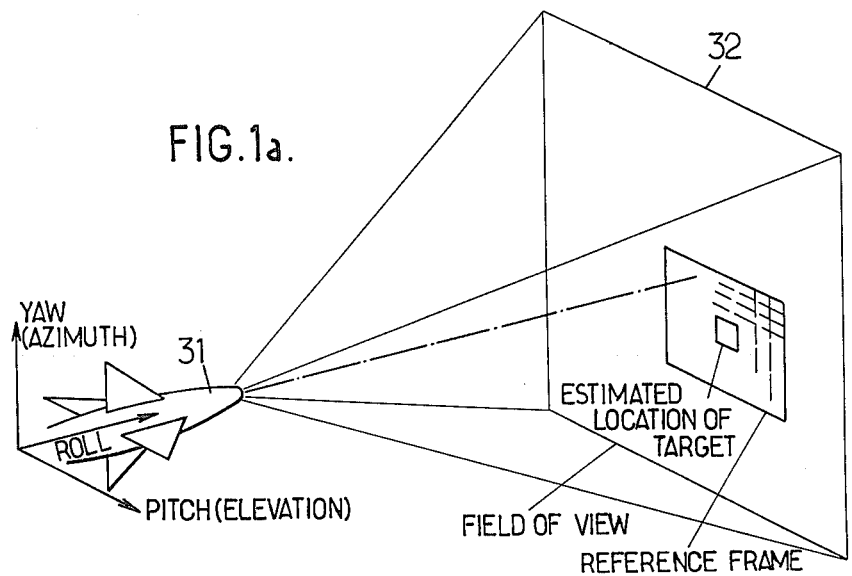
FIG. 1a is a perspective diagrammatic view showing the field of view of the camera of a missile guidance system and the scene which is stabilized.

The tracking system comprises an electro-optical infrared scanning camera whose sensitive elements are formed by the n sensing elements of a C.C.D. detector array 30 which will be assumed to be vertical or, more precisely, parallel to the yaw axis of the missile. An optical scanning device, typically consisting of two contra-rotating prisms or an oscillating mirror, which may be of a type well known in the art, oscillates the optical axis with an angular reciprocal movement in the azimuth (bearing) direction, throughout the azimuth extent of the field of view 32 (FIG. 1a).

In a typical arrangement, the array comprises $n=32$ sensing elements associated with the optics of the camera to provide a field of view having a vertical extent of 96 milliradians. The useful scanning zone in the horizontal direction is for instance 157 milliradians, as shown in FIG. 1. In a preferred embodiment, a scanning device may be used which vertically shifts the optical axis during the return scan (or during the next scan) by half the spacing of two lines. The number of sweep lines is then doubled, the lines of the return scan being interlaced with the lines of the forward scan instead of being superimposed thereon.

That result may be obtained for example by slightly tilting the oscillating mirror upon each reversal of direction or by using two rotary mirrors slightly offset in direction.

Such scanning is shown in FIG. 1 where the forward lines are shown with a continuous line, the return lines with a broken line.

Referring to FIG. 1a, a camera fixed to a missile 31 follows the angular movements of the latter, in particular the pitching movements thereof which may reach 50 milliradians per second in a situation representative of reality. On the other hand, it will be assumed that the attitude of the missile about the roll axis is stabilized and consequently practically constant (typically within a 3° range).

Figure 2:
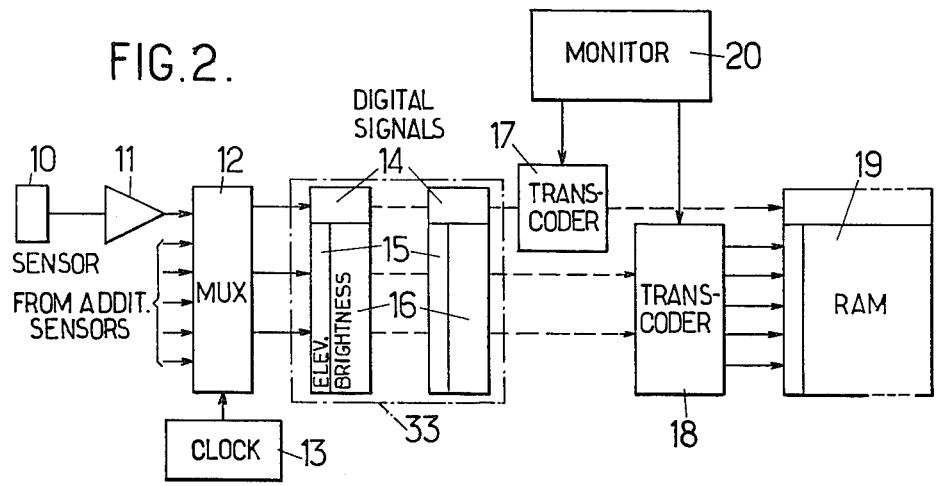
FIG. 2 is a simplified block diagram of the electronic circuit of the apparatus.

Each sensing element 10 of strip 30 is associated with an amplifier 11. All amplifiers are connected to a single encoding multiplexer (FIG. 2).

The thirty-two amplifiers associated with the thirty-two sensing elements 10 of the strip each supply a continuous analog signal. The thirty-two signals are each sampled and coded in a very short time (typically about 0.1 millisecond) by the single encoding multiplexer 12 associated with a clock 13. The clock triggers delivery of coded digital signals at times corresponding to precisely defined bearings of the optical scanning device. The train of thirty-two coded digital signals which are available from the encoding multiplexer for a same bearing are shown schematically at 14. All signals have the same bearing address. The thirty-two successive signals each have a particular elevation signal 15 and a brightness representative word 16. All signals are temporarily stored in a memory designated as a whole as 33.

In the particular example described, there are sixty-four different elevation addresses (each corresponding to a sensing element and a line of scan). The thirty-two uneven addresses are used for the forward scan; the thirty-two even addresses are for the return scan. The brightness word has typically four or eight bits, depending on the desired accuracy.

In the prior art arrangements, each of the signals would be written into a RAM memory at an address location. At the end of the first complete scan, the memory would then contain the representation of the set of pixels representing the image; but the representation would only be accurate if the camera were fixed with relation to the scene; movements of the camera would blur the image.

In the apparatus of the invention, part only of the digital signals are written into the memory 19. (those pixels whose addresses in elevation and in azimuth are included in a predetermined window encompassing the expected location of the target). That window is moved (within the total field of view of the camera) in response to the angular movements of the camera due to steering of the missile. A pattern recognition device (which is not part of the invention) will additionally move the window to track the target and provide input signals to the steering system.

As indicated above, the yaw and pitch movements of the axis of the missile disturb the interlacing of the image formation optical beams. In particular, pitch affects cooperation of the forward and return scans.

Moreover, if there were no corrective action, the size of the image of a predetermined fraction, of fixed linear size, of the scene observed by the camera would appear on the image with a variable size as the camera comes closer to the scene. The change appears in FIG. 3 where that part of the scene which is initially observed under an angle $\alpha_0$, appears through a larger angle $\alpha$ at a later time after the missile has come closer to the target which is part of the scene.

There will now be described how the invention achieves centering in position and size stabilization of the image. It should be noted that size stabilization of the image by a zoom effect does not change the appearance of the image or at least of the part thereof which remains within the field of view of the camera. The target "window" (image of the scene or of a determined fraction thereof) has fixed linear dimensions despite the decrease in the distance between the missile and target.

Figure 3:
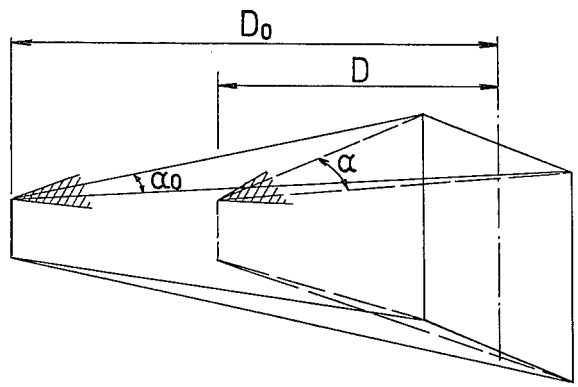
FIG. 3 is an illustration of the changes in the angle under which the scene is viewed as the distance between the camera and the scene decreases and is compensated for by a zoom effect.

Referring to FIG. 3, that result is obtained by modifying the angular width of the image in both directions in response to variations of $D/D_0$, $D$ being the current distance and $D_0$ the initial distance.

In the embodiment of FIG. 2, the modifications are achieved by two transcoders 17 and 18 (FIG. 2) whose operation will be described first for the sake of clarity.

Centering in the horizontal (bearing) direction

For simplicity, it will be assumed that analysis of the image takes place over a useful field less than the total field of view, 40 pixels wide (i.e. 24 milliradians).

In the specific situation considered, the pixels give a redundant representation of the image. It is consequently sufficient for pattern recognition to analyze an image having a smaller number of points, which will be assumed to be thirty, corresponding again to an angular extent of 24 milliradians, during the first scan. The distance between adjacent points will then be 0.8 mrd. Ideally, these points should correspond to pixels spaced apart by $0.8 \times D_0/D$ milliradians. In practice, approximations will have to be made and, for this purpose, a reference frame will be elaborated at the theoretical (ideal) spacing and the pixels which are closest to the lines of the frame will be assigned thereto.

The corresponding transcoder is part of a picture representation monitor 20 arranged to compute for each successive image or half image; (if there is interlacing), the correct, i.e. centered position of the useful scene from the expected direction of the target, the direction of flight (roll axis) of the missile and the distance D. Computation may be supplied by a processor on board the missile or outside with remote transmission. The horizontal (azimuth) extent of the analyzed scene will be defined by its position in the field of view and its angular width. From there on, the analyser divides the horizontal extent into thirty equal parts and computes the thirty corresponding azimuths.

In fact, the software of the monitor will typically be written so as not to compute the azimuth values explicitly, but rather to compute the coordinates of the nodes (crossing points of vertical and horizontal lines) of the grid constituting the reference frame. Anyway, the angular coordinate (bearing) of each vertical line of the reference frame may be so defined.

Referring to FIGS. 4 and 5, the modification of the spacing of the vertical lines of the reference frame is caused to occur as the missile 31 travels along a collision course toward the target. During the first scan, the scene to be analyzed is selected for the estimated or theoretical position 16 of the target to be at the center of the scene and reference frame. The vertical lines will for instance be 0.8 milliradians apart (FIG. 4). During subsequent scans, the spacing between the lines of the canvas is increased in proportion to the decrease of D, as shown in FIG. 5.

The transcoder 17 will compare the forty horizontal (azimuth) coordinates of the pixels stored in the memory positions 15 and will select only those whose coordinates are the closest to the addresses of the frame lines. That selection constitutes a first address transcoding rule used for retrieving the pixels which will form the image. It is not necessary to describe transcoder 17 since its construction will be simple and based on the use of digital comparator circuits or a processor.

The accuracy of the centering in the horizontal direction is, for each pixel, better than 0.3 milliradian, i.e. better than the optical definition of the image: such transcoding consequently does not detrimentally affect the representation.

Vertical centering

In the described embodiment, a difficulty should be overcome with vertical centering which does not exist for horizontal centering. The theoretical spacing apart of the lines (1.5 milliradian) is such that there is no pixel redundancy. Moreover, this spacing is not exactly respected if the axis of the camera exhibits pitch. The forward scanning lines and the return scanning lines do not correctly interlace.

The method which will now be described allows nevertheless a satisfactory image to be obtained. It comprises forming at the time of the first scan, an ideal frame having 25 parallel horizontal lines (FIG. 4) whose spacing is 1 milliradian in the particular embodiment which is considered for illustrating the invention.

For that purpose, the control circuits 20 select the nine horizontal scanning lines which best correspond to a centered position of the estimated location of the target for the first forward scan (FIG. 4). The horizontal line closest to that position, denoted P, will form the base line 0. placed in the middle of a twenty-five line memory and will be stored as such. The numbers of the four adjacent scanning lines in the upper half of the field will be stored as frame lines 3, 6, 9 and 12 (shown with continuous lines in the figure). Similarly, the adjacent scanning lines in the lower half of the image will be stored as frame lines $-3$, $-6$, $-9$ and $-12$.

The control circuits then define, by linear interpolation between the nine lines of the forward scan, sixteen intermediate lines, some of which are shown by broken lines in FIGS. 4 and 5, which represent the ideal position in elevation of the next scanning lines in the absence of a closing movement.

During the return scan, then the subsequent scans, only those actual scanning lines whose position is within the frame defined by the nine original lines 12, 9,..., 0, $-3$,..., $-12$ are retained. And each of these lines (eight at the beginning and then more as the target draws nearer) is assigned to that stored line which corresponds to the nearest position which may be either one of the intermediate lines or one of the original lines. Moreover, in order to improve image accuracy, the pixels whose offset with respect to the frame lines exceeds a predetermined value (0.3 milliradian for example) may be simply rejected.

To sum up, the nine horizontal scanning lines closest to the expected position of the target are selected to define a frame of 25 lines (FIG. 4) just before the first scan. The image representation is formed, eight lines at a time, and later up dated. As the target closes up, more than eight lines may be up dated following each scan. During the return scan following the first forward scan and the subsequent scans, the pitch movements of the missile will have to be taken into account to address each scanning line to its correct position in the image representation stabilized by data processing. Thus, each scanning line is addressed with an accuracy of 0.5 milliradian, three times better than the optical definition of the camera.

The spacing between adjacent horizontal lines of the reference frame is 1 milliradian, whereas the theoretical definition is 1.5 milliradian. It might be thought that there is no benefit in selecting such a small value of the spacing.

In fact, this procedure is of great advantage. The actual accuracy and definition of the image may be appreciably greater than the theoretical geometrical definition (which is 1.5 milliradian in the particular example) for the size of the optical diffraction spot is usually much smaller than the definition (better than 1 milliradian in the example considered). Consequently, a small heat source gives in the sensor an image which is more or less bright depending on whether its diffraction spot is at the center of the sensor or on the contrary close to the edge.

More information may thus be drawn from the image by using pixels which are slightly closer together than might be supposed from the size of the sensor.

An apparent shortcoming of the approach used is that the image representation may not be wholly "informed" or formed during the first scan and the next ones. If it is assumed that the frame does not change in size, the probability for all lines to have been "informed" after seven half-scans (i.e. in 0.25 second with a representative scanning rate) is only 82%. But the pattern recognition software may be designed to have a good probability of correct image classification, even if one line out of three in the frame is not yet informed. And the fact that the image is accurate and well centered compensates largely for the fact that it is slightly incomplete for a few tenths of a second.

Furthermore, as shown in FIG. 5, the frame will expand progressively as the missile closes up with the target, whereas the angular spacing of the pixels remains the same: consequently, the transcoder may be designed for up dating more than eight lines per scan when the missile closes up.

While the invention relates to image stabilization and centering only, and the method and apparatus which have been described may be implemented in a number of existing guidance systems using pattern recognition, some indications as to a particular guiding system will now be given although they are not necessary for a full understanding of the invention.

Figure 6:
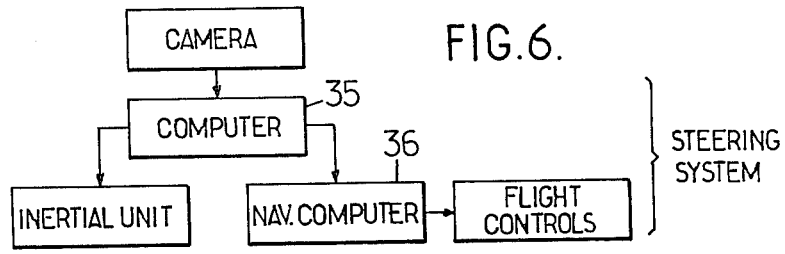
FIG. 6 is a simplified diagram of a steering system for a missile which may include the invention.

Referring to FIG. 6, a conventional missile steering system comprises an IR camera interfacing with a computer 35 which also receives information from an inertial unit carried by the missile. Date from the inertial unit and computer 35 are fed to a navigation computer 36 which provides the information necessary for a flight control unit to steer the missile, for instance by acting on pitch and yaw fins.

Figure 7:
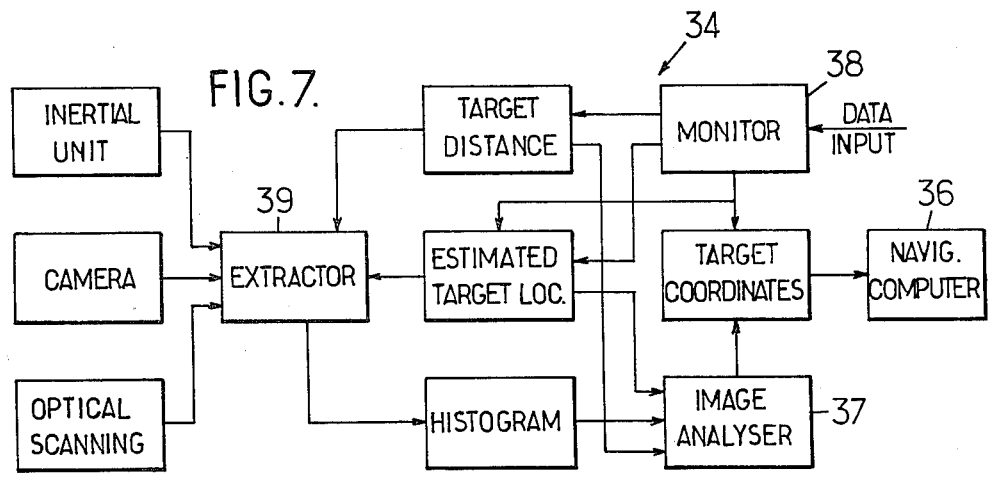
FIG. 7 is a simplified representation of the data flows in an apparatus according to the invention.
Figure 8:
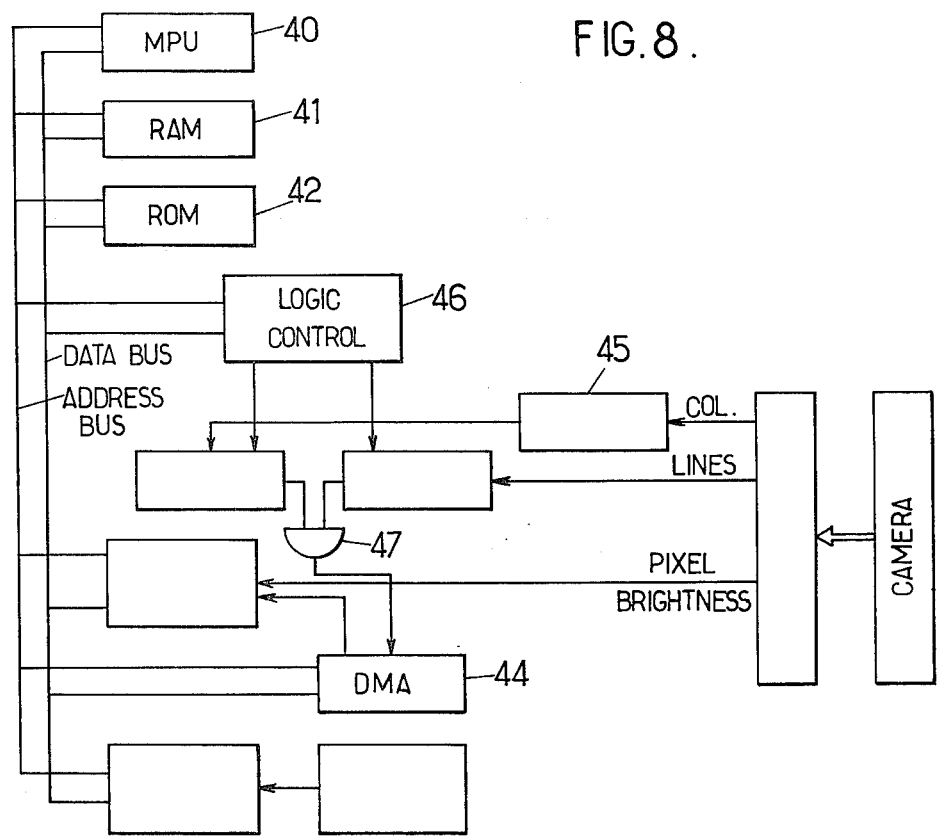
FIG. 8 is a simplified block diagram of an apparatus according to the invention.

Referring to FIG. 7 (which indicates the data flows) and FIG. 8 (which is a simplified block diagram of the monitor and extractor), computer 35 may be considered as including the control circuit 20 of FIG. 2 and having:

a monitor 38 for initializing the system and particularly providing an indication of the original distance and estimated location of the target in the field of view;

an image analyzer 37 for pattern recognition, which will not be described and whose function is to determine the actual location and the distance of the target from data received from the monitor and later from the extractor;

an extractor 39 for selecting the features of the image which will be used by the analyzer (histograms and/or significant graphemes) and the whole representation of the analyzed scene window in the form of selected pixels.

The invention relates to that part of the extractor which achieves stabilization and centering and which will now be described.

At the beginning of the flight, an estimated indication of the distance and the angular position of the target with respect to the missile line of flight (bearing and elevation) is provided by the monitor 38 to the extractor 39. When for instance the missile is fired from an aircraft, firing will take place while the plane and missile are directed to the target which will consequently be at the center of the field of view. An indication of the distance provided by a range finder on the aircraft may be entered into the monitor at the instant of firing.

At the same time, the monitor writes the target coordinates in the field of view into a memory, indicated as "target coordinates" in FIG. 7. The coordinates will later be up dated by the image analyzer.

As indicated above, the IR image is obtained by horizontal scanning on a vertical strip of 32 optical sensors. The camera consequently delivers successive trains of signals, each train corresponding to a column of a matrix. Each signal train includes the number of the column corresponding to the train of signals (i.e. the common vertical coordinates, along the yaw axis), as well as words corresponding to one of the pixels (vertical position and brightness). Bearing and elevation signals from the inertial unit are also received by the extractor. A simple computing process makes it possible to determine the window to be analyzed by correcting the preceding window responsive to the error found on the position of the target with respect to the center of the preceding window and the yaw and pitch movements of the missile since the preceding scan, as determined by the inertial unit.

Just before each scan, the extractor determines the sensing elements which best match with the horizontal lines of the reference frame. During scan, the extractor retains the pixels corresponding to the "column" (vertical lines of pixels) which best corresponds with the vertical lines of the reference frame. That selection is made using a signal representative of the condition of optical scanning system (angular position of the rotating prism for instance).

The information necessary for the image analyzer reevaluating the position of the target is delivered (for instance in the form of histograms). In response, the image analyzer corrects the estimated position of the target.

The system may be implemented as indicated in FIG. 8 around a microprocessor unit 40 (MC 6809E for instance) associated with a random access memory 41 and a ROM 42. The MPU 40 delivers the target tracking information to the flight computer. Since a MPU is not fast enough for real time selection of the pixels in the analyzed window and memory write-in, a fast logic circuit is associated. That logic circuit is programmed by the MPU before each scan. It selects among the pixels and causes storing into memory by a DMA circuit 44 (6848 for instance). The interface logic has a priority access to the address and data buses, whereby the information may be written into the RAM memory without transfer through the internal registers of the MPU.

Before each scanning, the MPU computes the coordinates of the lines and columns of the window and programs the control logic which operates in response to the angular position of the prism of the optical scanning system.

The means for selection are illustrated in FIG. 8 as including an interface consisting of components 12 and 33 in FIG. 2. The transcoders 17 and 18 of FIG. 3 include a column comparator for determination of the columns of pixels to be retained. That comparator cooperates with a logic control interface and stores the transcoded column addresses at 46. Assuming that the number of pixels available in the vertical direction are less in number than the lines of the reference frame, transcoding in that direction may be made by assigning each pixel in a retained column to the closest vertical coordinate of the frame, provided by the logic control interface 46. The transcoded addresses are both transferred by a circuit 47 to the DMA 44.

Although a single embodiment of the invention has been described in detail, it will be appreciated by those skilled in the art that numerous modifications are possible. For instance, the same centering method may be used for both directions, particularly if there is redundancy (or lack of redundancy) of the pixels in both directions. The reference frame may be determined by any suitable approach.

Whatever the embodiment, the signals to be stored in the memory 19 of FIG. 2 or RAM 41 of FIG. 8 can be processed by an extractor whose complexity will be very much decreased as compared with a conventional system, since that extractor will have to deal with successive images having the same brightness and the same size. Comparison of such images with a stored reference pattern is rendered much easier.

I claim:
1. A method for real time stabilization of the image of a scene in the field of view of an optoelectrical camera, comprising the steps of:
generating a reference frame having an invariable location with respect to said scene, defined by a set of addresses representative of predetermined points of said frame, each said point having predetermined coordinates in said frame,
generating a series of pixels each representative of a particular point in the field of view of said camera,
determining the coordinates of each said pixel in said frame,
comparing the coordinates of each said pixel in said frame,
and assigning said pixels to those of said predetermined points of said frame with which there is the best match.

2. A method according to claim 1, wherein said pixels are assigned by transcoding addresses thereof to the addresses of particular ones of said points in said reference frame.

3. A method according to claim 1, wherein determination of the coordinates of said pixels includes:
determining coordinates of said pixels in said field of view;
and computing the true coordinates by correction in response to signal representing angular movements of said camera with respect to the scene.

4. A method according to claim 2, wherein said predetermined points have a spacing in at least one direction of said reference frame smaller than the spacing of said pixels in the same direction and transcoding is carried out by assigning each available pixel to the address in said direction of that predetermined point of the reference frame which is closest.

5. A method according to claim 2, wherein said predetermined points have a spacing in at least one direction of said reference frame which is greater than the spacing of said pixels in said direction and transcoding is carried out by assigning the address of each said point in said direction to that pixel which is closest in said direction.

6. Method according to claim 1, including scaling up and down said frame whereby a zoom effect is obtained.

7. Method according to claim 6, wherein the camera is movable toward and away from the scene and the reference frame is scaled up and down in relation with the distance between the scene for obtaining an image representation of constant width.

8. Apparatus for providing a stabilized image of a scene comprising:
a scanning optoelectrical camera for providing pixels representative of a scene,
means for providing individual representations of said pixels during each scan of the camera as digital words identifying an elevation address, an azimuth address and the brightness of said pixel,
means for generating a reference frame having a matrix of predetermined points each having an azimuth address and an elevation address.
means for maintaining said frame in an invariable position with respect to said scene irrespective of angular movements of said camera,
and comparison and transcoding means for assigning said pixels to those of said points with which there is the best address match.

9. Apparatus for providing a size stabilized image of a scene, comprising:
a scanning optoelectrical camera for providing pixels representative of a scene,
means for providing individual representations of said pixels during each scan of the camera as digital words identifying an elevation address, an azimuth address and the brightness of said pixel,
means for generating a reference frame having a matrix of predetermined points each having an azimuth address and an elevation address,
means for measuring the changes in distance between said camera and scene, and providing signals representative of said changes,
means responsive to said signals for scaling up and down said reference frame in response to variations in said distance,
and comparison and transcoding means for assigning said pixels to these of said points with which there is the best address match.

* * * * *